US 7,468,727 B2

(12) United States Patent
Wong et al.

(10) Patent No.: US 7,468,727 B2
(45) Date of Patent: Dec. 23, 2008

(54) METHODS OF VISUALIZING GRAPHS (76) Inventors: Pak C. Wong, 306 Rockwood Dr., Richland, WA (US) 99352; Patrick S. Mackey, 1003 S. Young St., Kennewick, WA (US) 99338; Kenneth A. Perrine, 560 L Spengler St., Richland, WA (US) 99354; Harlan P. Foote, 333 Scot St., Richland, WA (US) 99352; James J. Thomas, 1939 Peach Tree La., Richland, WA (US) 99352

( * ) Notice: Subject to any disclaimer, the term of this patent is extended or adjusted under 35 U.S.C. 154(b) by 381 days.

(21) Appl. No.: 11/376,878

(22) Filed: Mar. 15, 2006

(65) Prior Publication Data

US 2006/0235825 A1  Oct. 19, 2006

Related U.S. Application Data

(60) Provisional application No. 60/728,957, filed on Oct. 21, 2005, provisional application No. 60/673,301, filed on Apr. 19, 2005.

(51) Int. Cl.
*G06T 11/20* (2006.01)
*G06F 3/048* (2006.01)
(52) U.S. Cl. .................... 345/440; 345/441; 715/853
(58) Field of Classification Search ......... 345/440–443, 345/619; 715/788, 850, 853–855, 712, 713
See application file for complete search history.

(56) References Cited

U.S. PATENT DOCUMENTS

| 5,424,945 | A | * | 6/1995 | Bell ........................... 715/209 |
| 6,373,484 | B1 | | 4/2002 | Orell et al. |
| 6,424,933 | B1 | | 7/2002 | Agrawala et al. |
| 2003/0007002 | A1 | | 1/2003 | Hida et al. |
| 2006/0209084 | A1 | * | 9/2006 | Wong et al. ................. 345/629 |
| 2006/0209085 | A1 | * | 9/2006 | Wong et al. ................. 345/629 |

OTHER PUBLICATIONS

XP-002387976, Mar. 1992, Jan Paredaens, et al.
PCT International Search Report and Written Opinion of the International Searching Authority (Jul. 25, 2006).
Humphrey, et al., Creating Reusable Visualizations with the Relational Visualization Notation, IEEE, 2000, pp. 53-60.
Becker, et al., Dynamic Graphics for Network Visualizaton, AT&T Bell Laboratories, IEEE, 1990, pp. 93-96.

* cited by examiner

*Primary Examiner*—Chante Harrison
(74) *Attorney, Agent, or Firm*—Allan C. Tuan (57) ABSTRACT

Methods for visualizing a graph by automatically drawing elements of the graph as labels are disclosed. In one embodiment, the method comprises receiving node information and edge information from an input device and/or communication interface, constructing a graph layout based at least in part on that information, wherein the edges are automatically drawn as labels, and displaying the graph on a display device according to the graph layout. In some embodiments, the nodes are automatically drawn as labels instead of, or in addition to, the label-edges.

19 Claims, 7 Drawing Sheets

Fig. 1

.* Edge-Label * Edge-Label * Edge-Label * Edge-Lab.

.* This label goes from West to East *.

*Fig. 3*

•*Label-Edge*Label-Edge*Label-Edge*Label•

*Fig. 4a*

•*Label-Edge*Label-Edge*Label-Edge*Label•

METHODS OF VISUALIZING GRAPHS

This application claims the benefit of priority to copending U.S. Provisional Applications 60/673,301, filed Apr. 19, 2005, and 60/728,957, filed Oct. 21, 2005. Both applications are incorporated herein by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Drawing graph labels in a clear and understandable fashion alongside elements of a graph has proven to be challenging. Using traditional approaches, labels can compete with other graph elements for drawing space creating occlusion and ambiguity problems. Furthermore, determining optimal locations for the labels can be algorithmically intractable, often requiring intense computational effort. The problem is especially apparent for labels of extended size or length. Accordingly, methods for visualizing graph labels in a clear and computationally efficient manner are required.

DESCRIPTION OF DRAWINGS

Embodiments of the invention are described below with reference to the following accompanying drawings.

DETAILED DESCRIPTION

At least some aspects of the disclosure provide methods for visualizing a graph on a computing device by automatically drawing elements of the graph as labels. Graph elements, as used herein, can refer to the basic units that compose a graph and can include, but are not limited to, nodes and edges. Accordingly, in one embodiment, the method comprises receiving node information and edge information from an input device and/or communication interface, constructing a graph layout based at least in part on that information, wherein the edges are automatically drawn as labels (i.e., label-edges), and displaying the graph on a display device according to the graph layout. In some embodiments, the nodes are automatically drawn as labels (i.e., label-nodes) instead of, or in addition to, the label-edges.

Labels, as used herein, can refer to objects that convey information about the graph elements with which they are associated. In some embodiments, the labels can exhibit animation. A specific example of an animated label is scrolling text. Generally, exemplary labels can include, but are not limited to, text, symbols, icons, images, and video. In one embodiment, the labels comprise real-time data. Examples of real-time data can include, but are not limited to, instant messaging conversations, stock tickers, news updates, digital communications across a computer network, digitally transcribed telephone conversations, E-mail messages, message board postings, blog postings, photo sharing between individuals, monetary transactions, and vehicle traffic and road conditions.

Node information and edge information, as used herein, can refer to data on which graphs are based. Exemplary node information can include, but is not limited to, node locations (e.g., coordinates) and node labels. Exemplary edge information can include, but is not limited to source node identifiers, destination node identifiers, and edge labels.

In some embodiments, wherein the node information comprises node locations, the graph layout is determined primarily by the node and edge information. In other embodiments, the graph layout can be determined automatically according to a graph layout algorithm. Alternatively, the graph layout can be determined by a combination of node information, edge information, and a graph layout algorithm. Examples of graph layout algorithms can include, but are not limited to, multiple correspondence analysis, multidimensional scaling, force-directed, parallel coordinate plotting, and seriation algorithms.

Figure 1:
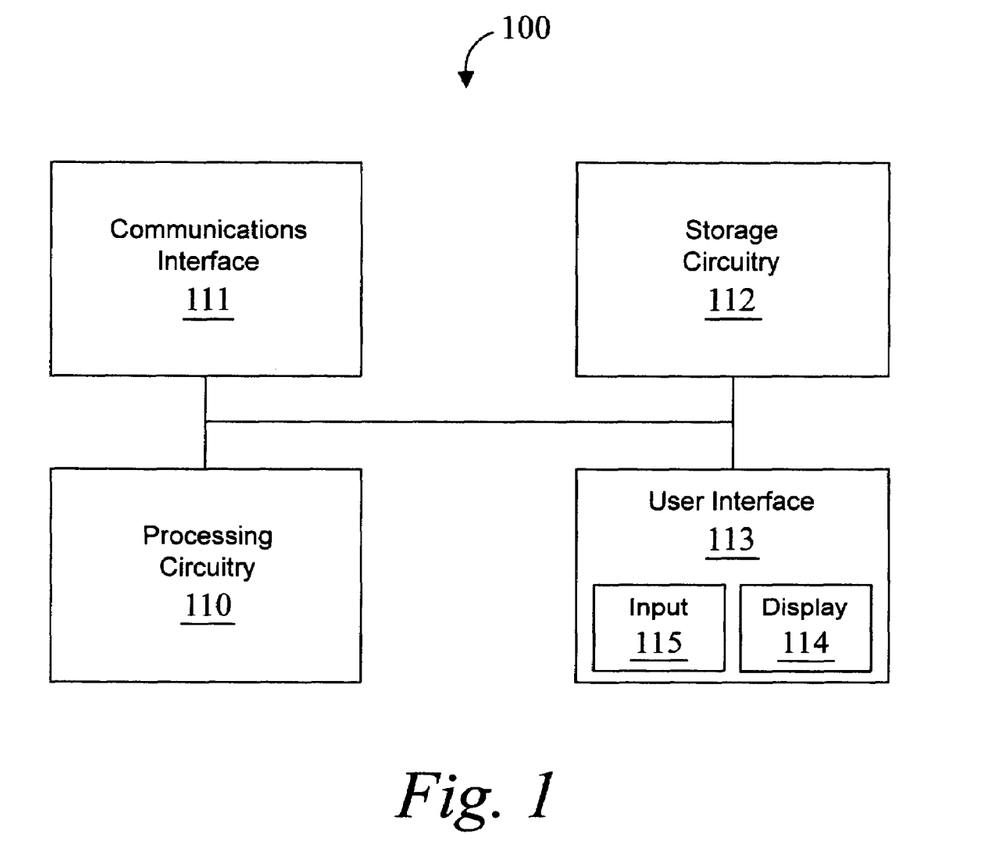
FIG. 1 is a block diagram of an apparatus according to embodiments of the present invention.

FIG. 1 is a block diagram of an exemplary apparatus, according to one embodiment of the present invention, for visualizing graph labels. In the depicted embodiment, the apparatus 100 is implemented as a computing device such as a server, work station, personal computer, or handheld computing device, and may include a communications interface 111, processing circuitry 110, storage circuitry 112, and a user interface 113. Other embodiments may include more, less, and/or alternative components.

The communications interface 111 can be configured to facilitate communications between the apparatus 100 and a network, external device, etc. The communications interface 111 can be implemented as a network interface card (NIC), serial or parallel connection, USB port, Firewire port, flash memory interface, floppy disk drive, optical media drive, or any other suitable arrangement for communicating with respect to the apparatus 100.

In one embodiment, communications interface 111 is configured to receive and access data from information sources for processing by apparatus 100. For example, communications interface 111 can be operably connected to a source of data including databases, the internet, email, news feeds, reports, and documents. Accordingly, node information, edge information, and/or graph layout algorithms can be received and accessed through communications interface 111.

In another embodiment, processing circuitry 110 can be configured to process data, control data access and storage, issue commands, control a graphical interface on a display device, and control other desired operations. For example, processing circuity 110 may operate to access data that are received by communications interface 111 and/or stored on storage circuitry 112. Processing circuitry 110 can then operate to construct a graph layout based on the accessed data node information, and edge information, wherein the graph layout comprises label-edges.

The processing circuitry 110 can comprise circuitry configured to implement desired programming provided by appropriate media in at least one embodiment. For example, the processing circuitry can be implemented as one or more of a processor and/or other structure configured to execute computer-executable instructions. Such instructions can include but are not limited to software instructions, firmware instructions, and/or hardware circuitry. Exemplary embodiments of processing circuitry 110 include hardware logic, PGA, FPGA, SAIC, state machines, and/or other structures alone or in combination with a processor. The examples above are given for purposes of illustration and other configurations are possible.

The storage circuitry 112 can be configured to store programming, electronic data, databases, node information, edge information, graph layouts, style format files, and/or other digital information and may include processor-usable media. Style format files, as used herein, can refer to files that store graph formatting information, which can be applied to sets of data. Programming, as used herein, can include executable code or instructions, for example, software and/or firmware. An example of programming can include programming configured to cause apparatus 100 to construct and display graph layouts based on node and edge information, wherein edges are automatically drawn as labels. Processor-usable media can include, but is not limited to, any computer program product or article of manufacture that contains, stores, and/or maintains programming, data, and/or digital information for use by, or in connection with, an instruction execution system, including the processing circuitry 110 in the instant embodiment. For example, processor-usable media can include any of the physical media such as electronic, magnetic optical, electromagnetic, infrared, or semiconductor media. Specific examples of processor-usable media can include, but are not limited to, portable magnetic computer diskettes (e.g., floppy disks), zip disks, hard drives, random access memory, read only memory, flash memory, cache memory, thumb drives, and compact disks. In one embodiment, node and edge information can be stored in a text file on processor-usable media.

At least some embodiments, or aspects described herein, may be implemented using programming stored within appropriate storage circuitry as described herein and/or communicated via a network or other appropriate transmission medium and configured to control appropriate processing circuitry. For example, programming can be provided via appropriate media, for example, articles of manufacture embodied by a data signal (e.g., modulated carrier wave, data packets, digital representations, etc.) communicated via an appropriate transmission medium. Examples of a transmission medium can include, but are not limited to, a communication network, a wired electrical connection, an optical connection, and/or electromagnetic energy communicating via the communications interface 111, or provided using other appropriate communication structure or medium. Exemplary programming, including processor-usable code, may be communicated as a data signal embodied in a carrier wave in but one example.

The user interface 113 can be configured such that a user can interact with apparatus 100. For example, the user interface 113 can convey data to the user and/or receive inputs from the user. Data conveyance can include, but is not limited to, displaying data for observation by the user and audibly communicating data to the user. User inputs through an input device 115 can include, but are not limited to, tactile input and voice instruction. In one illustrative embodiment, the user interface 113 comprises a visual display 114 configured to depict visual information and at least one input device 115. Examples of visual displays 114 can include, but are not limited to, cathode ray tubes, liquid-crystal displays, and plasma displays. Examples of an input device 115 can include, but are not limited to, a keyboard, mouse, and a pen and tablet combination.

The embodiments described herein can comprise an integrated unit configured to display graphs having edges drawn as labels. Other configurations are possible wherein apparatus 100 is configured, for example, as a networked server. The server can be configured to process node and edge information and construct graph layouts having label-edges. One or more clients comprising appropriately connected terminals can input the node and edge information and/or access the graph layouts for display, analysis, and/or additional manipulation by one or more users. Other configurations of apparatus 100 are possible.

Figure 2A:
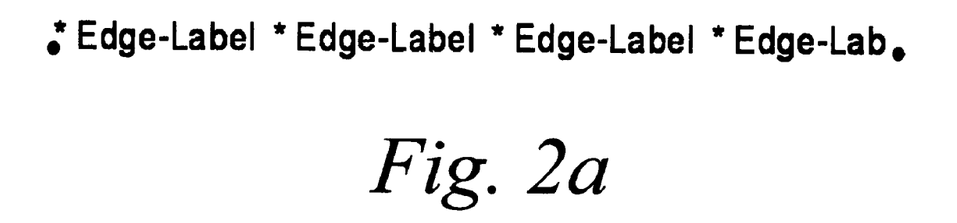
FIGS. 2a and 2b are illustrations of an embodiment of a label-edge and an embodiment of a label-node, respectively.
Figure 2B:
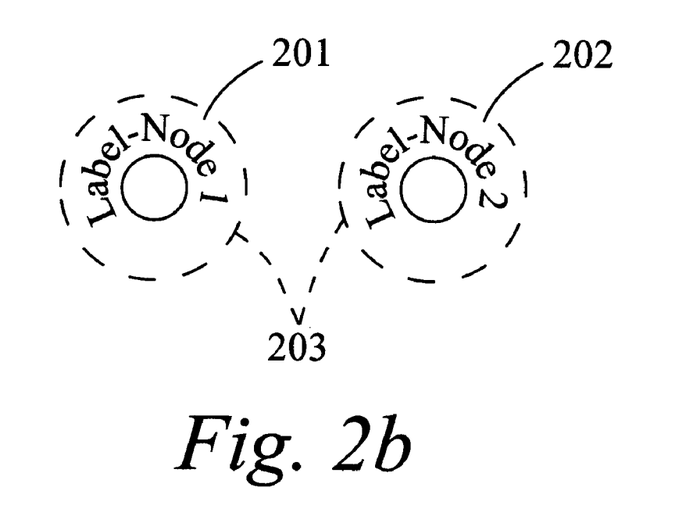

FIG. 2a is an illustration of an embodiment of a label-edge as described herein. According to the illustration, two nodes are linked by an edge that has been drawn as a label, which, in FIG. 2a, comprises exemplary text. FIG. 2b is an illustration of two exemplary label-nodes. As illustrated, the labels 201, 202 conform to the shape of a circular footprint 203. Alternatively, the label-node can be drawn in the form of, for example, a square, a triangle, or any other appropriate glyph. Labels that do not span the distance between nodes or are not sufficiently sized to form a glyph can be repeated. Labels that are too large and/or long can be scrolled along the label-edge or label-node.

In addition to scrolling, other types of animation are encompassed by embodiments of the present invention. For example, label-edges and/or label-nodes can flash, change resolutions and/or size, change transparency, cycle through a plurality of images, and/or display video. In some embodiments, the animation of a label-edge is prompted by user interaction through an input device. Accordingly, in one example, a user can place a mouse pointer over a label-node and the label-node can gradually change from being semitransparent to being opaque. Alternatively, for a text-based label-edge, the user interaction can prompt the label-edge to begin scrolling. In one embodiment, an index is used as an address for the locations of components in a label-edge, and scrolling comprises incrementing or decrementing the index at each animation time step. In another example, for label-edges comprising images or video, the user interaction can prompt the label-edge to begin cycling through images or playing video, respectively. For embodiments involving real-time data, instead of using a consistently incremented/decremented label index or an animation frame update, the real-time data components can be added to the label-edge as they are received. Accordingly, the label-edge can exhibit characteristics of a queue. If label length becomes greater than a predefined maximum label length, then the older components can be removed from the queue.

Figure 3:
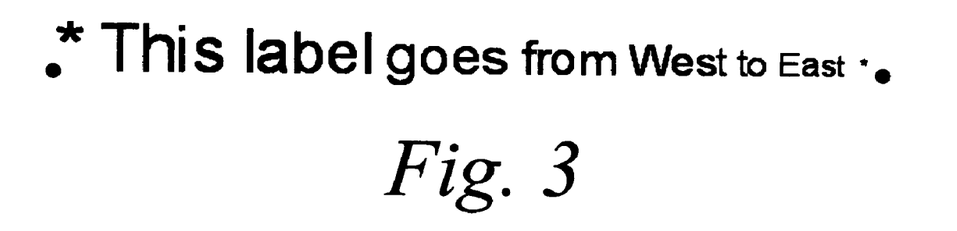
FIG. 3 is an illustration of an embodiment of a tapered label-edge.

In some embodiments, label-edges can have an inherent directionality (e.g., text) and the inherent directionality can indicate the direction of the label-edge. For example, in FIG. 2a, the label edge is read from left to right indicating that the source node is the lower-left node and the destination node is the upper right node. Alternatively, the label-edge can be tapered to indicate directionality. In one embodiment, the label size can be larger near the source node and can decrease in size towards the destination node. The tapering can be performed by applying an envelope function to the label-edge. For some embodiments, wherein the label-edge comprises text, the tapering can be performed by gradually changing the font size. Referring to FIG. 3, an exemplary tapered label-edge comprises text having a gradually decreasing font that indicates the directionality of the label-edge. In one embodiment, the current size of the first component, $S_1$, in a tapered label-edge can be determined according to the equation, $$S_1 = a \cdot r_0$$

wherein a is the default display size of the components in a label-edge and $r_0$ is a scaling ratio. The current size of each component thereafter, $S_i$, can be determined according to the equation, $$S_i = a\left(r_0 - \frac{(x_i - x_0)}{d}\right)$$

wherein $x_i$ is the starting location of the component, which is also the end point of the previous component; $x_0$ is the starting point of the label-edge; and d is the distance between the two nodes connected by the label-edge. In yet another embodiment, animation can be used to indicate the directionality of a label-edge. For example, a label-edge can scroll the label to indicate the direction of the label-edge.

In some embodiments, label-edges can be curved. Accordingly, label components can be placed on an arc connecting two nodes. While any number of curves can be applied, in a specific embodiment, the arc on which label components are placed is a quadratic arc. The quadratic arc can be computed by first determining from the graph layout the distance between two graph nodes. The width, w, and height, h, of a pretransformed curve can be determined based on the positions of the two nodes. The pretransformed coordinates, x and y, can then be calculated according to the following equation.

$$y = \frac{\left(x - \frac{w}{2}\right)^2}{\left(\frac{-w^2}{(4h)}\right)}$$

Figure 4A:
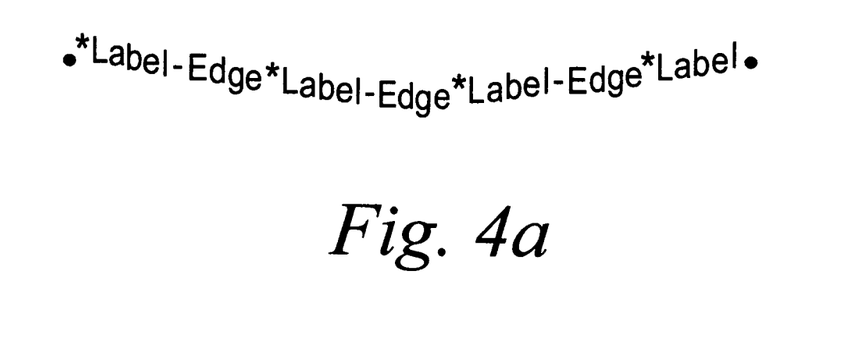
FIGS. 4a-4c are illustrations depicting embodiments of curved label-edges.

The coordinates can later be rotated by an affine transform to the final location. FIG. 4a is an illustration of an exemplary curved label-edge. While the illustration depicts a text label, the scope of the present invention is not limited to labels comprising text, as described elsewhere.

Figure 4B:
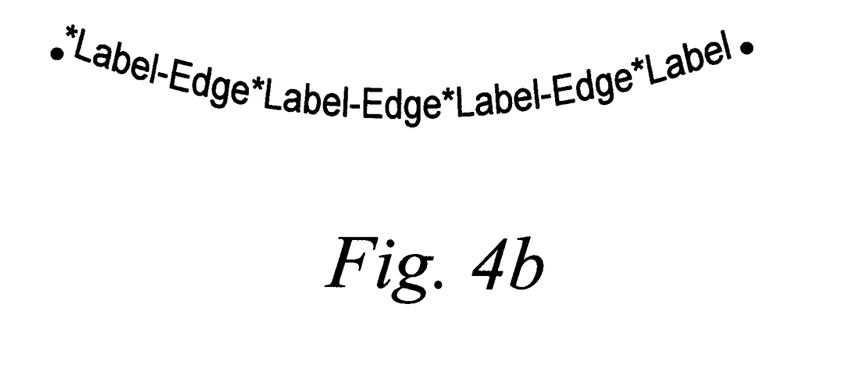

In some embodiments, components of a curved label-edge can also be rotated to conform to the arc of the label-edge. Referring to FIG. 4b, an exemplary curved label-edge comprising text is depicted, wherein the components (i.e., letters) have been rotated. In a specific embodiment, the angle of rotation for each component, $\theta_i$, of the label-edge can be determined according to the following equation.

$$\theta_i = \sin^{-1}\left(\frac{y_i - y_{i-1}}{\sqrt{(x_i - x_{i-1})^2 + (y_i - y_{i-1})^2}}\right)$$

Figure 4C:
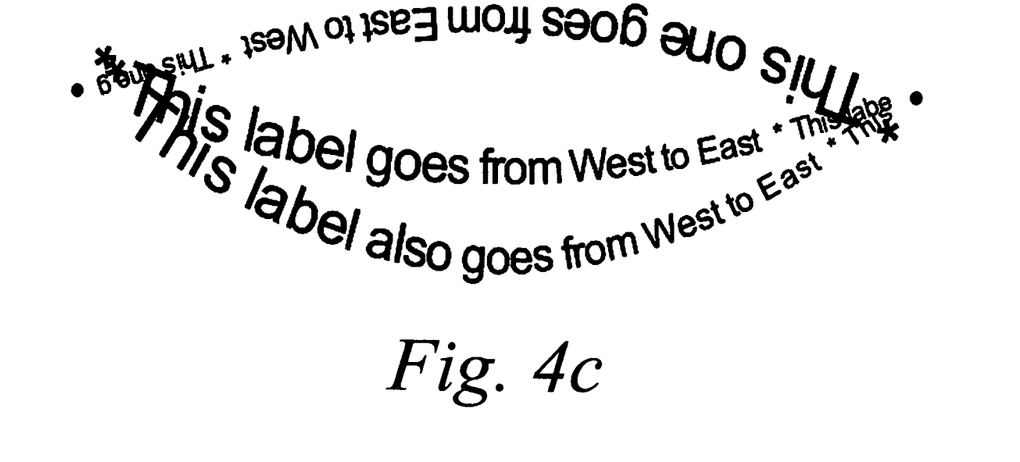

Multiple label-edges can intersect a pair of nodes. Label-edges comprising different labels can each be represented by different arcs. In one embodiment, a curve ratio value can be applied to each label-edge. The specific curve ratio value can be determined dynamically according to the number of label-edges between the nodes. Application of the curve ratio value helps ensure that no two label edges have the same arc and/or cover the same area. Label-edge characteristics such as direction (e.g., left and right), size, orientation (e.g., up and down) can be interactively selected by a user through an input device or the characteristics can be pre-defined, for example, in a style format file. FIG. 4c is an illustration of an embodiment of three label-edges intersecting a pair of nodes. The curve and orientation of each label-edge is based on a different quadratic arc to prevent overlap. The letters have been rotated to enhance the appearance and readability of the curved label-edges. Additionally, the label-edges are tapered to further indicate directionality. Since the labels in FIG. 4c do not span the distance between the nodes, the labels are repeated.

Figure 5:
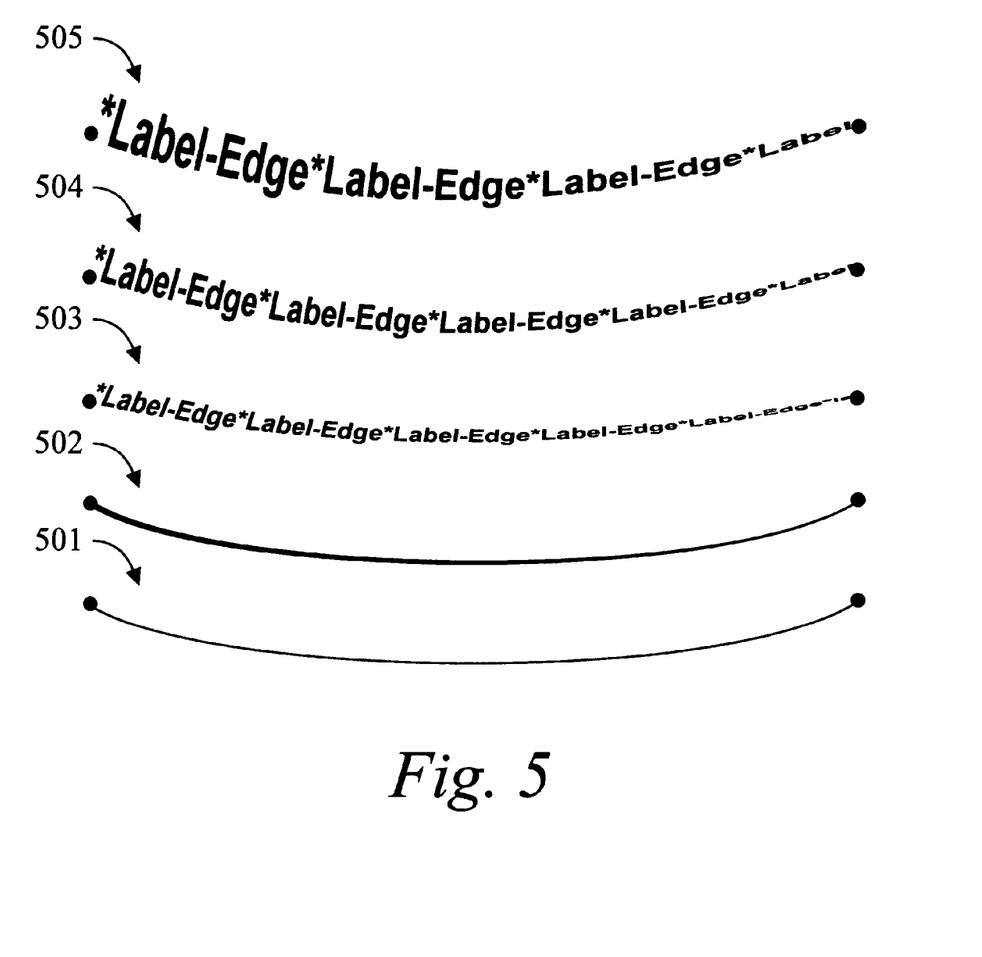
FIG. 5 is an illustration of embodiments of label-edges having various sizes and/or resolutions.

In some embodiments, label-edges and/or label-nodes can be drawn as lines when the text is too small to be legible. When the scale of the portion of the graph containing the label-edges or label-nodes is sufficiently large, the actual labels can then be drawn instead of a single, or multiple, pixel line. Alternatively, the label-edges and/or label-nodes can switch between lines and actual labels based on user-interaction events. Exemplary user-interaction events can include, but are not limited to, mouse-overs, mouse clicks, key strokes, highlights, and area selections. FIG. 5 is an illustration comparing a label-edge drawn as a line 501 and as actual labels at four different resolutions 502-505. As described herein, the label-edge can change from a line 501 to a larger resolution label 505 upon a user-interaction event.

Figure 6A:
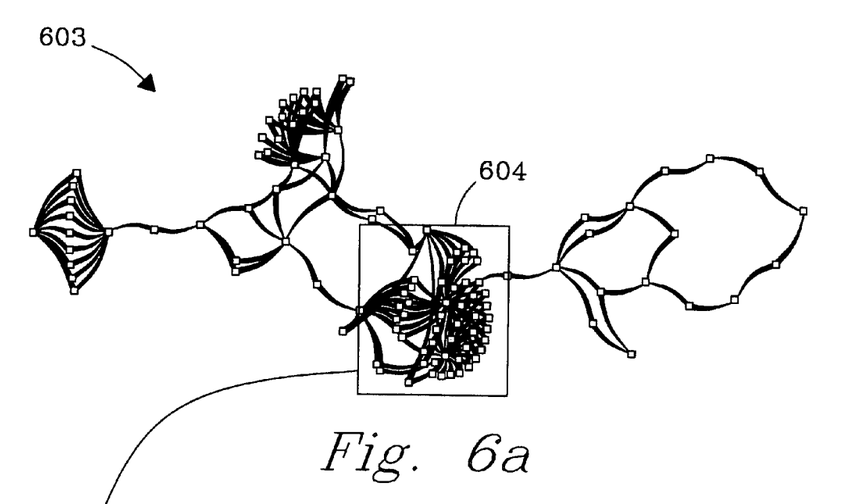
FIGS. 6a-6c are illustrations of an embodiment of a graph that highlights the use of semi-transparent label-edges and label-nodes.
Figure 6B:
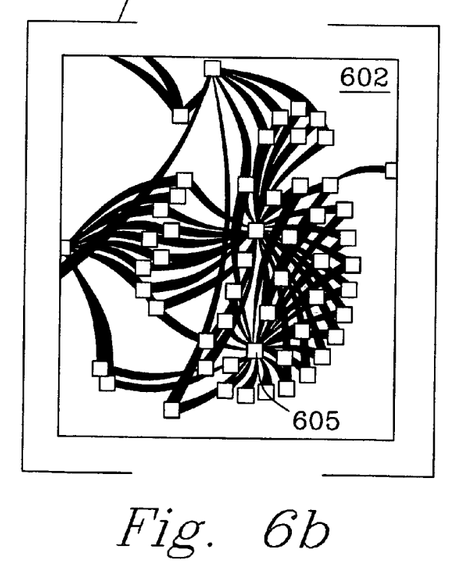
Figure 6C:
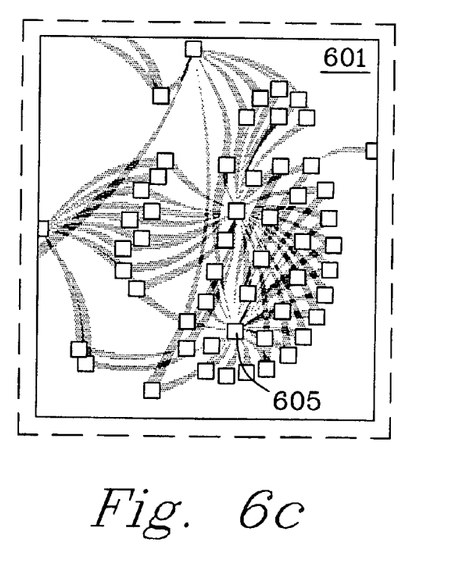

While the use of multi-resolution labels in label-edges and label-nodes can be one way to simplify crowded regions of a graph, high-centrality nodes can still be problematic. Accordingly, in some embodiments of the present invention, label-edges and/or label-nodes can be semi-transparent. In one embodiment, displaying the label-edges and/or label-nodes as semi-transparent comprises applying alpha-channel blending. Referring to FIG. 6a-6c, an exemplary graph 603 contains a complex area 604 having at least one high-centrality node 605. The inset 602 in FIG. 6b highlights and details the region of complexity on the graph, wherein the label-edges are opaque. In contrast to inset 602, an alternative representation 601 in FIG. 6c shows the complex area 604 using exemplary semi-transparent label-edges that clarify the linkages to the high-centrality node 605.

Figure 7A:
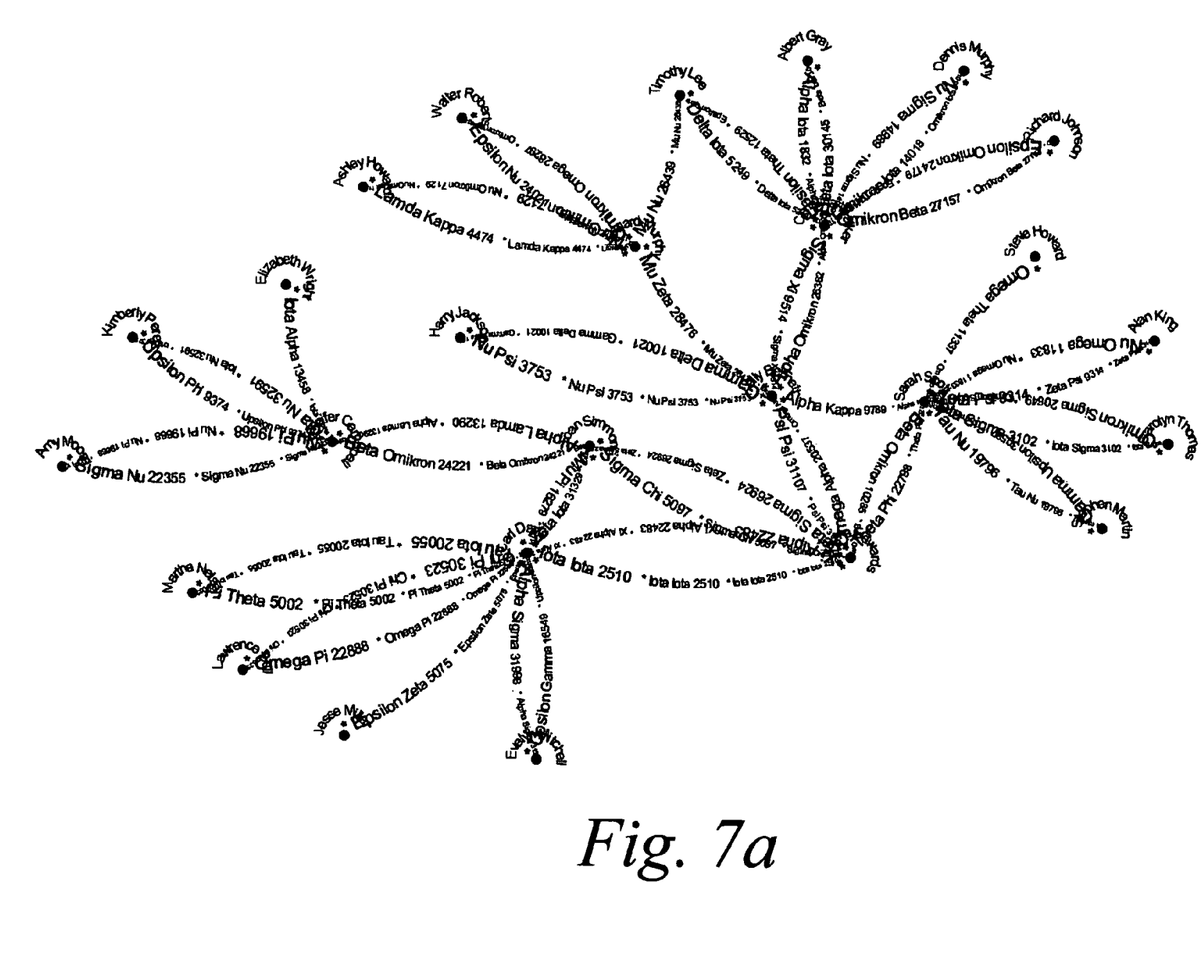
FIGS. 7a and 7b are illustrations of embodiments of complete graphs having edges and/or nodes drawn as labels.
Figure 7B:
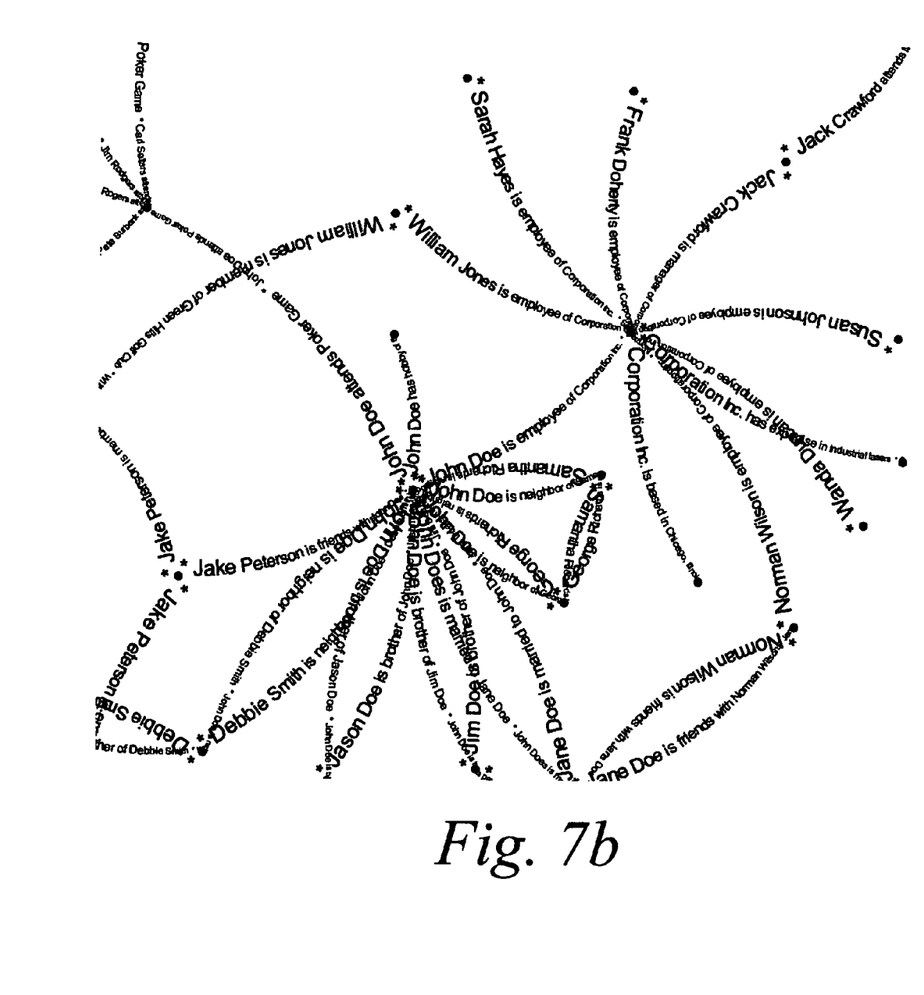

Referring to the embodiments in FIGS. 7a and 7b, complete examples of graphs having edges and/or nodes drawn as labels are shown.

In some instances, label-edges and/or label-nodes can be exhibit a difficult-to-read orientation. For example, a label-edge comprising text might be oriented sideways or upside-down relative to a user viewing a display. Therefore, in some embodiments, the graph itself can be animated to enable rotation, panning, and/or zooming. Combinations of animations (e.g., rotating and zooming) can be performed simultaneously or sequentially. Graph animation can be prompted by user interaction. Exemplary user interaction can include panning by dragging a pointer device, zooming in on a particular region by highlighting that region with a pointer device, rotating by dragging a pointer device. Alternatively, the graph orientation can be adjusted automatically when a label-edge or label-node is highlighted or selected. For example, if a label-egde is selected by a user, an animation sequence can be performed, which rotates, pans and/or zooms so that the selected label-edge it is substantially parallel with one edge of the screen, and takes up a proportion of the screen determined by a predefined variable. Animation sequences can be done so that the rotating, panning and zooming are done in separate continuous sequences, or in one simultaneous sequence. A reverse zoom/centering function can be used to return a user to the previous and/or original position. This can be achieved by multiplying the zoom, rotation and panning steps by a value of −1, and running the animation sequence again.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method for visualizing a graph on a computing device, the method comprising
   receiving node information and edge information;
   constructing a graph layout based on the node information and the edge information, wherein edges are automatically drawn as labels that are selected from the group consisting of text, symbols, icons, images, video and combinations thereof, thereby forming label-edges; and
   displaying the graph on a display device according to the graph layout.

2. The method as recited in claim 1, wherein nodes are drawn as labels, thereby forming label-nodes.

3. The method as recited in claim 2, wherein the label-nodes are drawn in the form of a glyph.

4. The method as recited in claim 1, wherein labels comprise real-time data.

5. The method as recited in claim 1, wherein no occlusions exist in the graph layout.

6. The method as recited in claim 1, wherein label-edges comprise repeating labels to span the distance between nodes connected by the label-edges.

7. The method as recited in claim 1, wherein labels indicate the directionality of a label-edge.

8. The method as recited in claim 1, further comprising animating label-edges.

9. The method as recited in claim 8, wherein animation of the label-edges is prompted by user interaction through an input device.

10. The method as recited in claim 8, wherein said animating comprises scrolling the labels of a label-edges.

11. The method as recited in claim 1, further comprising applying curvature to label-edges.

12. The method as recited in claim 11, wherein the curvature is unique for each of a plurality of label-edges intersecting a node.

13. The method as recited in claim 12, wherein the curvature indicates the directionality of a label-edge.

14. The method as recited in claim 11, further comprising rotating components of a label to enhance the appearance of a curved label-edge.

15. The method as recited in claim 1, further comprising tapering label-edges to indicate directionality.

16. The method as recited in claim 1, further comprising displaying the label-edges as semi-transparent.

17. The method as recited in claim 16, wherein displaying the label-edges as semi-transparent comprises applying alpha-channel blending to the label-edges.

18. The method as recited in claim 1, further comprising automatically orienting the graph for optimum viewing by rotating, panning, zooming, or a combination thereof.

19. The method as recited in claim 18, wherein said rotating is prompted by user interaction through an input device.

* * * * *